United States Patent
Mavanur et al.

(10) Patent No.: US 7,352,112 B2
(45) Date of Patent: Apr. 1, 2008

(54) HYBRID PIEZOELECTRIC-MAGNETOSTRICTIVE ACTUATOR

(75) Inventors: Anil Mavanur, Littleton, MA (US); Jordan Cormier, Westminster, MA (US)

(73) Assignee: Energen, Inc., Lowell, MA (US)

( * ) Notice: Subject to any disclaimer, the term of this patent is extended or adjusted under 35 U.S.C. 154(b) by 305 days.

(21) Appl. No.: 11/264,643

(22) Filed: Nov. 1, 2005

(65) Prior Publication Data

US 2007/0096600 A1  May 3, 2007

(51) Int. Cl.
*H01L 41/08* (2006.01)
*H03N 2/04* (2006.01)

(52) U.S. Cl. .......................................... 310/328; 310/26

(58) Field of Classification Search .............. 310/26, 310/328, 323.02, 1, 12, 317; 333/157, 215; *H02N 2/04; H01L 41/08*
See application file for complete search history.

(56) References Cited

U.S. PATENT DOCUMENTS

| | | | | |
|---|---|---|---|---|
| 4,443,731 | A | * | 4/1984 | Butler et al. ................. 310/328 |
| 5,306,979 | A | * | 4/1994 | Schwarz, Jr. ................ 310/328 |
| 5,543,670 | A | * | 8/1996 | Luecke ......................... 310/26 |
| 6,249,064 | B1 | * | 6/2001 | Bradbury ..................... 310/26 |
| 6,998,999 | B2 | * | 2/2006 | Fripp et al. .................. 310/334 |

OTHER PUBLICATIONS

"Inertial solutions", Feb. 2004, http://www.inertialsolutions.us/products_servo_control.htm.
"HSG2320 Lightweight Bi-Axis Gimbal Actuator," Feb. 2004, http://www.starsys.com/products/electromagneticactuators/biaxisassemblies/product.asp?ID=HSG2320.
"Orbiter GNC & C, Subsystem Weekly Update," Feb. 2004, http://www.estec.esa.nl/conferences/esmats99.
R. Venkataraman, "A Hybrid Actuator," M.S. thesis, University of Maryland, 1995.
B. Clephas and H. Janocha, "New Linear Motor With Hybrid Actuator," in *Proceedings SPIE* 3041, 1997, pp. 316-325.
"Magnetic Bearings," Feb. 2004, http://www.airex.com/products/magnetic.htm.

* cited by examiner

*Primary Examiner*—Darren Schuberg
*Assistant Examiner*—Karen B. Addison
(74) *Attorney, Agent, or Firm*—Sam Pasternack; John Lanza; Choate Hall & Stewart LLP

(57) ABSTRACT

Hybrid actuator. The actuator includes a piezoelectric actuator spaced apart from a magnetostrictive actuator. A linkage is in contact with the piezoelectric and magnetostrictive actuator, the linkage having an end including microgrooves. A rotatable shaft includes microgrooves mating with the microgrooves in the linkage end. Electronic circuitry is provided to drive the piezoelectric actuator and the magnetostrictive actuator resulting in the piezoelectric and the magnetostrictive actuators moving 180° out of phase thereby moving the linkage to rotate the shaft. It is preferred that the actuators be driven at resonance. In one embodiment, the actuator includes three actuators to provide motion about three axes. In another embodiment the actuator is a linear actuator.

17 Claims, 3 Drawing Sheets

HYBRID PIEZOELECTRIC-MAGNETOSTRICTIVE ACTUATOR

BACKGROUND OF THE INVENTION

This invention relates to an actuator and more particularly to a hybrid piezoelectric-magnetostrictive rotary or linear actuator.

Many devices require rotary (or linear) motion on a lightweight platform. An example includes actuators for antenna stabilization and pointing platforms. Existing antenna stabilization and pointing systems are commonly based on servomotors, stepper motors, or less commonly, on piezoelectric actuators. See, "Inertial Solutions" February, 2004, http://www.inertialsolutions.us/products_servo_control.htm; "HSG2320 Lightweight Bi-axis Gimbal Actuator," February, 2004, http://www.starsys.com/products/electromagneticactuators/biaxisassemblies/product.asp?ID=HS G2320; and "Orbiter GNC & C, Subsystem weekly update," February, 2004, http://www.estec.esa.nl/conferences/esmats99. Most of these prior art systems are 1-or 2-axis systems.

A single-axis rotary motor using magnetostrictive and piezoelectric materials to create an electrical resonance circuit has been built. See, R. Venkataraman, "A Hybrid Actuator," M. S. thesis, University of Maryland, 1995. The motor design was optimized for use as a helicopter flaperon. A linear motor has also been built using the same concept. See, B. Clephas and H. Janocha, "New Linear Motor With Hybrid Actuator," in *Proceedings SPIE* 3041, 1997, pp. 316-325.

Airex Corporation of Dover, N.H. has developed a spherical motor-bearing system that is advertised for high-accuracy pointing systems. This is a five degree-of-freedom system (two rotational and three translational) and is intended to carry heavy payloads. See, "Magnetic Bearings," February, 2004, http://www.airex.com/products/magnetic.htm.

Many of the existing antenna pointing and stabilization systems are too heavy, take up too much space, and/or require too much power for the small unmanned aerial vehicles (UAVS) on which they would be installed. In the motor described by Venkataraman cited above, a piezoelectric stack clamps a mask to a disc while a magnetostrictive rod pushes the mass tangential to the disc. This configuration relies on friction to advance the disc to provide rotary motion. This motor is single-axis only. Because this motor relies on friction, large forces cannot be transmitted.

The Airex magnetic bearing mentioned above is one of a class of "electronic gimbals" that many believe will eventually replace mechanical gimbals. Such electronic gimbals, however, are generally bulky and are well suited for high payload requirements but are not a good solution for small and micro-UAVs.

SUMMARY OF THE INVENTION

In one aspect, the actuator of the invention is a rotary actuator and includes a piezoelectric actuator spaced apart from a magnetostrictive actuator. A linkage is in contact with the piezoelectric and magnetostrictive actuators and the linkage has an end including microgrooves. A rotatable shaft including microgrooves mates with the microgrooves in the linkage end. Electronic circuitry drives the piezoelectric actuator and the magnetostrictive actuator resulting in the piezoelectric and magnetostrictive actuators moving 180° out of phase thereby moving the linkage to rotate the shaft. It is preferred that the actuators be driven at resonance.

In another aspect, the invention is a rotary actuator including three of the actuators set forth above with the three actuators stacked so that a bottom actuator rotates a payload and the other two actuators. An intermediate actuator is supported on the bottom actuator and provides tilt, with the axis of the bottom and intermediate actuators being perpendicular to each other. A third actuator is supported on the intermediate actuator and the axis of the third actuator is perpendicular to the axis of the intermediate actuator.

In a preferred embodiment of this aspect of the invention the bottom actuator provides 270° of rotation, the intermediate actuator provides 90° of tilt, and the third actuator provides 20° of tilt.

In another aspect, the actuator of the invention is a linear actuator and includes a piezoelectric actuator whose axis forms an angle with the axis of a magnetostrictive actuator. Ends of the piezoelectric and magnetostrictive actuators engage a forcing structure in contact with an output shaft. Activation of the piezoelectric and magnetostrictive actuators moves the forcing structure in a way to advance the output shaft.

The actuator of the invention is lightweight and compact, provides high force and uses low amounts of power. For the same size, the hybrid actuator or motor of the invention will produce larger forces than conventional actuators. The actuator provides high-speed response to changes in direction and the use of the magnetostrictive material in an LC circuit operating at resonance makes the system very efficient. The system lends itself to miniaturization and provides backlash-free precision motion. The actuator disclosed and claimed herein is of simple construction and has simple controls enabling easy retrofit into existing systems. The invention is applicable to a variety of applications in addition to antenna pointing such as fly-by-wire to adaptive wings.

DESCRIPTION OF THE PREFERRED EMBODIMENTS

Figure 1:
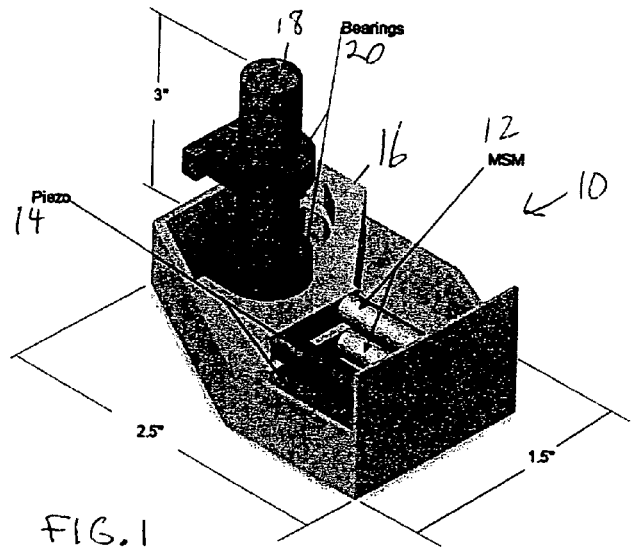
FIG. 1 is a perspective view of a conceptual design of the hybrid actuator according to one embodiment of the invention.
Figure 2:
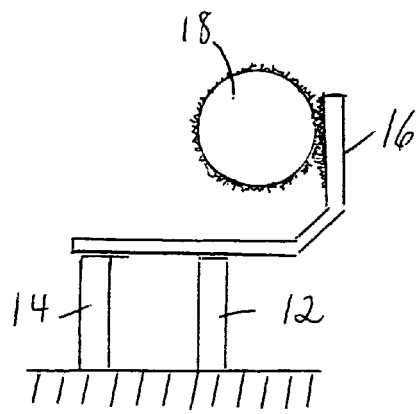
FIG. 2 is a plan view of an embodiment of the actuator showing the mating of microgrooves on a rotatable shaft and a moveable linkage.

With reference first to FIG. 1, a rotary actuator 10 includes magnetostrictive material (MSM) actuators 12 and piezoelectric actuators 14. As is well known to those of skill in the art, magnetostrictive materials change their shape under the influence of a magnetic field. It is well known that alloys of terbium, dysprosium and iron of varying stoichiometries exhibit magnetostriction. Similarly, piezoelectric materials change their shape upon the application of an electric field. The magnetostrictive material actuators 12 and piezoelectric actuators 14 drive a linkage 16 an end of which mates with a shaft 18. The shaft 18 is supported by bearings 20. The linkage 16 is designed so that linear motion of the actuators 12 and 14 is converted to partly rotary motion at its end in contact with the shaft 18. With reference to FIG. 2, it can be seen that an end of the linkage 16 and the shaft 18 are microgrooved to ensure good contact and a high coefficient of friction. The term "microgroove" is intended to cover any surface roughening such as pockets, protrusions, etc. It is preferred that there be two sets of actuators and linkages that are run out of phase as shown in FIG. 1 so that the shaft 18 is always driven.

Figure 3A:
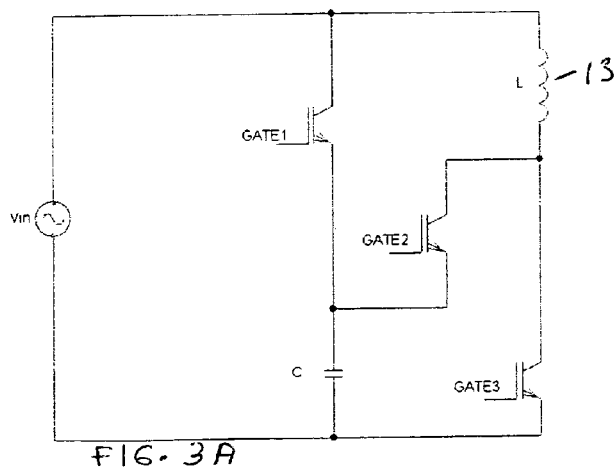
FIG. 3A is a schematic diagram of one embodiment of circuitry utilized in the invention.
Figure 3B:
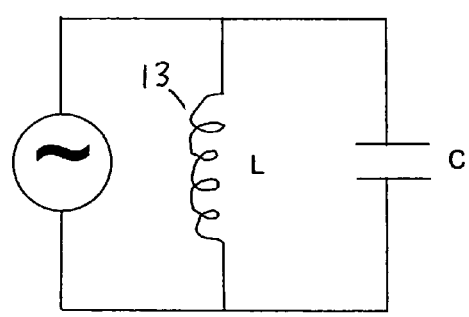
FIG. 3B illustrates a parallel arrangement of actuator elements.

The MSM 12 is driven by a coil 13 (FIGS. 3A and 3B) having an inductance L and the piezoelectric actuator 14 can be represented by a capacitance C. Actuators with piezoelectric or magnetostrictive transducers have the well-known advantages of high forces and short response times, but the disadvantage of a high capacitive or inductive reactive power requirement. As shown in FIGS. 3A and 3B, piezoelectric (represented by capacitance C) and magnetostrictive (represented by inductance L) transducers can be connected in a circuit such that the reactive energy is exchanged between both transducers. In the schematic of FIGS. 3A and 3B, the piezoelectric 14 and the MSM drive coil 13 are represented by C and L respectively. Gate 1, Gate 2 and Gate 3 are insulated gate bipolar transistors in this embodiment. Such transistors are fast acting solid-state switches.

Initially, Gate 1 and Gate 3 are closed and Gate 2 is open so as to form a parallel LC circuit (also called a tank circuit). This circuit has a resonant frequency $$\omega = \sqrt{\frac{1}{LC}}.$$

By definition, at resonance, the inductance $X_L$ is still equal to the capacitance $X_C$. The voltage is the same; the reactances are equal. Therefore, according to Ohm's law, the $I_L$ and $I_C$ must be equal. Even though the currents are equal they are still opposites with the capacitor charging before the inductor. That is, if the current is flowing "up" in the capacitor, it is flowing "down" in the coil, and vice versa. In effect, while one component draws current, the other returns it to the source. The net effect of this "give and take action" is that zero current is drawn from the source at resonance.

Figure 4:
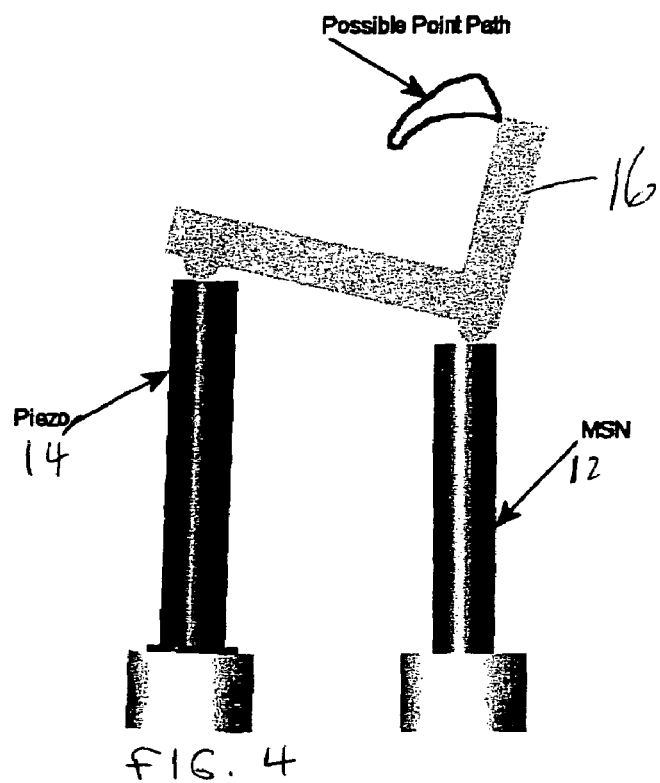
FIG. 4 is a cross-sectional view of an embodiment of the actuator of the invention showing a possible path taken by an end of a linkage.

The discussion above assumes perfect inductors and capacitors. In an actual circuit, there are always resistances involved that draw a small current from the source. Although the current draw from the source is small, the current circulating in the inductor and capacitor is high at resonance. Thus, the reactive energy is exchanged between complementary transducer types, the external power source has only to compensate for the inner losses (such as hysteresis, internal resistance and other losses), and the energy is transferred into mechanical work. Operation at resonance leads to a highly efficient, mechanically compact system. The actuators need not operate at resonance, but the power consumption will go up in that case. A schematic drawing of the linkage 16 is shown in FIG. 4.

Operating at resonance runs the MSM 12 and piezoelectric 14 180° out of phase. The path traced by an end of the linkage 16 is as shown in FIG. 4. Assuming a stroke of 10 µm for each actuator, the linkage 16 design ensures that the shaft 18 is turned by that amount for each cycle. The capacitance of the piezoelectric element 14 is dependent on preload and operating conditions although it is usually of the order of 100 nF. The inductance of the coil 13 driving the MSM actuators 12 is usually about 10 mH implying that the resonant frequency is 5033 Hz. Assuming that the shaft 18 has a diameter of 0.74 cm (0.25 in) and moves 10 µm 10,066 times per second (2×5033, as there are 2 units operating out of phase), this corresponds to a speed of 5.13 revolutions per second or 270° in approximately 0.15 second.

To reverse the direction of rotation of the shaft 18, Gate 1 and Gate 3 are opened and Gate 2 is closed to establish a series LC circuit. The resonant frequency of the series circuit remains the same and the reactive energies are still exchanged to form a very efficient system. The only difference with the series arrangement is that the inductor L is charged before the capacitor C so that the path traced by the linkage end is in the opposite direction.

Figure 5:
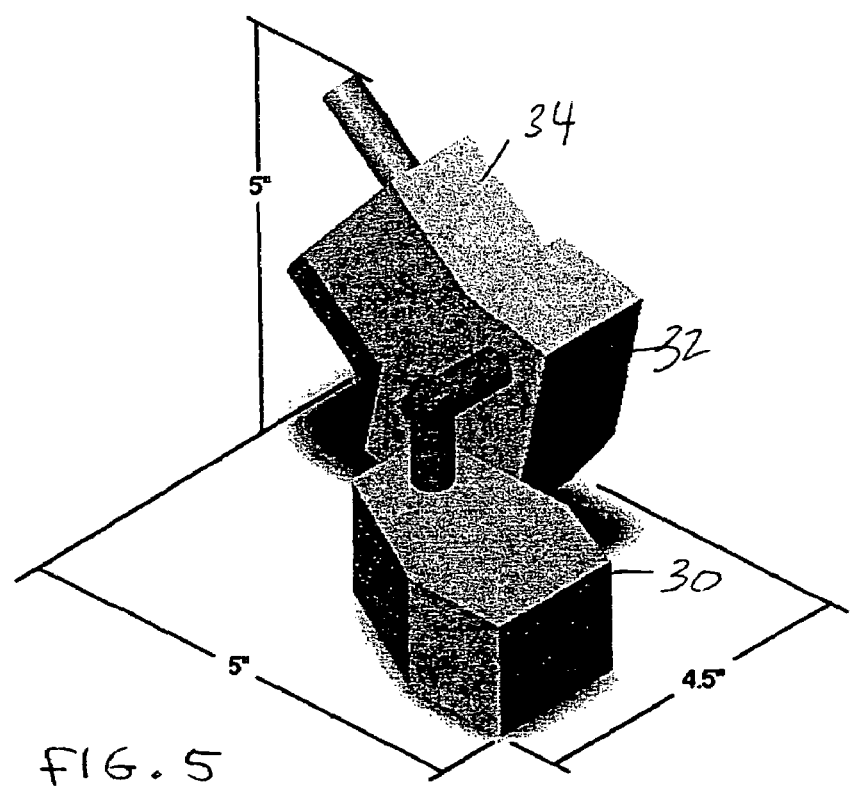
FIG. 5 is a perspective view of a three-axis arrangement of an embodiment of the hybrid actuator system of the invention.

A three-axis arrangement of a hybrid actuator according to another embodiment of the invention is shown FIG. 5. The figure illustrates three hybrid motors described above stacked to form a complete arrangement. A bottom motor 30 provides 270° rotation and it rotates a payload and two other motors through this angle. An intermediate motor 32 is stacked on the bottom motor 30 and provides 90° of tilt. The shafts of the two motors 30 and 32 are perpendicular to each other. A third motor 34 is stacked on the intermediate motor 32 and provides rotation about an axis perpendicular to the axis of the intermediate motor 32 and accomplishes 20° of tilt. It is to be recognized that all three motors can move through 270° if desired. It is also to be noted that the above angular ranges are merely exemplary and other ranges are within the scope of the invention. Since the three motors 30, 32, and 34 are used for the three axes, each of them can be run independently, meaning that the device can be aligned within 0.15 second. This reaction time is merely exemplary; the reaction time may be optimized to comply with requirements of particular applications. Those skilled in the art will appreciate that off-the-shelf encoders may be used to achieve the angular accuracy required.

Figure 6:
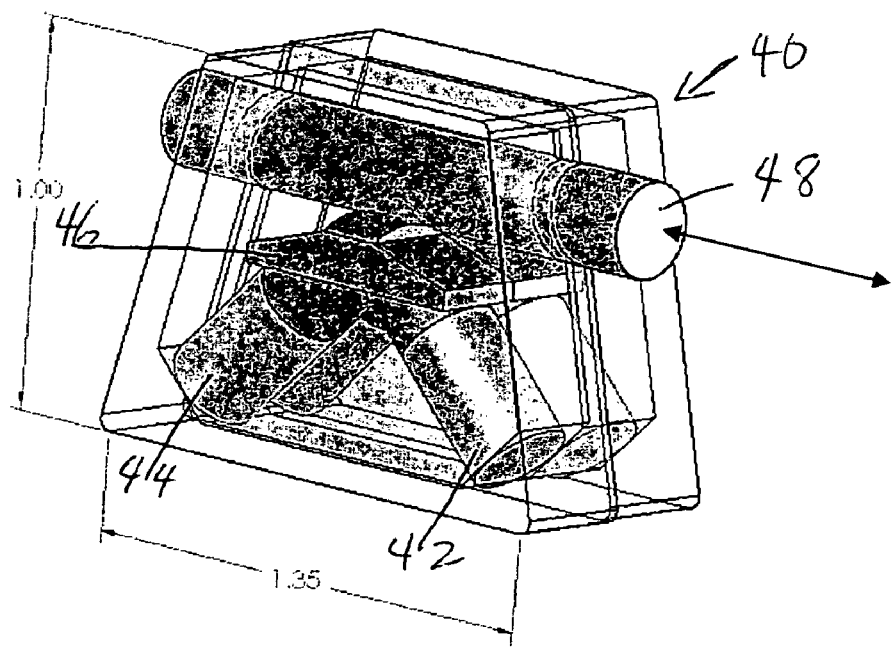
FIG. 6 is a perspective view of an embodiment of a linear actuator of the invention.

With reference now to FIG. 6, a linear actuator assembly 40 includes a piezoelectric actuator 42 and a magnetostrictive actuator 44. The axes of the actuators 42 and 44 form an angle as shown in FIG. 6. Ends of the actuators 42 and 44 engage a forcing structure 46 that in turn engages an output shaft 48.

Figure 7:
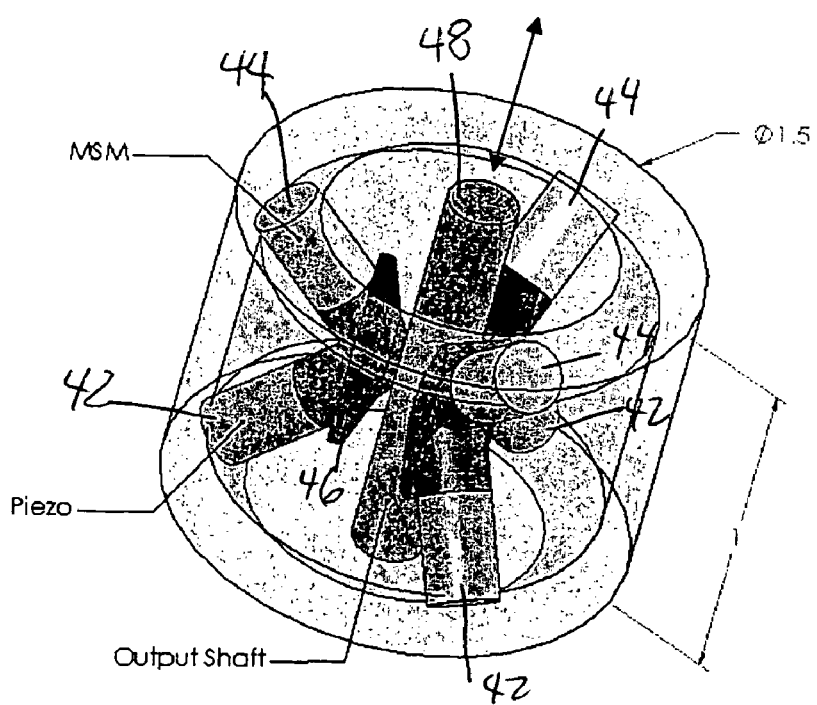
FIG. 7 is a perspective view showing three linear actuators to drive an output shaft.

When the actuators 42 and 44 are driven as described above with respect to the rotary actuator embodiment of the invention, the forcing structure 46 will move the output shaft 48 in a linear fashion. FIG. 7 is another arrangement of a linear actuator. In the embodiment of FIG. 7 three linear actuators comprising three sets of piezoelectric actuators 42 and magnetostrictive actuators 44 are arranged to urge the output shaft 48 in a linear fashion. The arrangement in FIG. 7 produces high forces on the output shaft 48. As with the rotary actuator embodiments discussed above, the forcing structure 46 and output shaft 48 may be roughened to heighten the transmitted force.

Alternative embodiments of the invention are contemplated. For example, the hybrid actuator of the invention may be configured as a single-axis or two-axis configuration. Different angular ranges for rotation about the various axes may be provided. Many different magnetostrictive materials are suitable for use in the MSM actuator. A preferred material is KelvinAll,® a patented material available from Energen, Inc. of Lowell, Mass. This material will allow the hybrid actuator disclosed herein to be used in cryogenic applications.

It is recognized that modifications and variations of this invention will be apparent to those of ordinary skill in the art and it is intended that all such modifications and variations be included within the scope of the appended claims.

What is claimed is:

1. Rotary actuator comprising:
   a piezoelectric actuator spaced apart from a magnetostrictive actuator;
   a linkage in contact with the piezoelectric and magnetostrictive actuators, the linkage having an end including microgrooves;
   a rotatable shaft including microgrooves mating with the microgrooves in the linkage end; and
   electronic circuitry driving the piezoelectric actuator and the magnetostrictive actuator resulting in the piezoelectric and magnetostrictive actuators moving 180° out of phase thereby moving the linkage to rotate the shaft.

2. The actuator of claim 1 wherein the actuators are driven at resonance.

3. The actuator of claim 1 wherein the magnetostrictive actuator comprises a drive coil associated with a magnetostrictive material.

4. The actuator of claim 3 wherein the circuitry is a parallel arrangement of the piezoelectric actuator and the coil of the magnetostrictive actuator.

5. The actuator of claim 3 wherein the circuitry is a series arrangement of the piezoelectric actuator and the coil of the magnetostrictive actuator.

6. The actuator of claim 3 wherein the electronic circuitry includes a voltage source operating at a frequency $$\omega = \sqrt{\frac{1}{LC}}$$

where L is the inductance of the drive coil and C is the capacitance of the piezoelectric actuator.

7. The actuator of claim 4 wherein the circuitry includes three gates comprising insulated gate bipolar transistors.

8. The actuator of claim 1 wherein stroke of the piezoelectric and magnetostrictive actuators is approximately 10 µm.

9. The actuator of claim 1 wherein capacitance of the piezoelectric actuator is approximately 100 nF.

10. The actuator of claim 1 wherein inductance of the drive coil is 10 mH.

11. Rotary actuator including three of the actuators set forth in claim 1, the three actuators stacked so that a bottom actuator rotates a payload and the other two actuators; an intermediate actuator supported on the bottom actuator and providing tilt, the axes of the bottom and intermediate actuators being perpendicular to each other; and
    a third actuator supported on the intermediate actuator, the axis of the third actuator perpendicular to the axis of the intermediate actuator.

12. The actuator of claim 10 wherein the bottom actuator provides 270° of rotation.

13. The actuator of claim 10 wherein the intermediate actuator provides 90° of tilt.

14. The actuator of claim 10 wherein the third actuator provides 20° of tilt.

15. Linear actuator comprising:
    a piezoelectric actuator in angled relation to a magnetostrictive actuator;
    a forcer structure in contact with the piezoelectric and magnetostrictive actuators;
    an output shaft in contact with the forcer structure; and
    electronic circuitry driving the piezoelectric actuator and the magnetostrictive actuator resulting in the piezoelectric and magnetostrictive actuators moving 180° out of phase thereby moving the forcer structure to move the output shaft in a linear fashion.

16. The linear actuator of claim 15 wherein the actuators are driven at resonance.

17. The actuator of claim 5 wherein the circuitry includes three gates comprising insulated gate bipolar transistors.

* * * * *